(12) United States Patent
Parfitt

(10) Patent No.: US 11,316,339 B2
(45) Date of Patent: *Apr. 26, 2022

(54) ELECTRONIC DEVICE CONFIGURATION

(71) Applicant: Eaton Intelligent Power Limited, Dublin (IE)

(72) Inventor: Stewart John Parfitt, Whempstead (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 24 days.

This patent is subject to a terminal disclaimer.

(21) Appl. No.: 17/034,358

(22) Filed: Sep. 28, 2020

(65) Prior Publication Data

US 2021/0013710 A1 Jan. 14, 2021

Related U.S. Application Data

(63) Continuation of application No. 16/079,875, filed as application No. PCT/GB2017/050188 on Jan. 25, 2017, now Pat. No. 10,811,872.

(30) Foreign Application Priority Data

Feb. 24, 2016 (GB) .................................... 1603207

(51) Int. Cl.
*H02H 9/00* (2006.01)
*H02H 1/00* (2006.01)
(Continued)

(52) U.S. Cl.
CPC ......... *H02H 9/008* (2013.01); *G06F 9/44505* (2013.01); *H02H 1/0061* (2013.01);
(Continued)

(58) Field of Classification Search
CPC .. H02H 9/008; H02H 1/0061; G06F 9/44505; H04B 5/0062
(Continued)

(56) References Cited

U.S. PATENT DOCUMENTS 1,815,233 A 7/1931 Burke
4,099,216 A 7/1978 Weberg
(Continued)

FOREIGN PATENT DOCUMENTS

DE 198 29 528 C1 2/2000
JP 200533319 A 12/2005
(Continued)

OTHER PUBLICATIONS

Paul S. Babiarz, Making Start with the Field Device, Jan. 1, 2005, 20 pages.
(Continued)

*Primary Examiner* — Yong Hang Jiang
(74) *Attorney, Agent, or Firm* — Stinson LLP

(57) ABSTRACT

An electronic functional device such as an isolator arranged to offer configurable functionality for alteration of the function of the device. The device includes wireless reception means for receiving wireless configuration data for the selective configuration of the device, and can also include wireless transmission means for the wireless transmission of data identifying its configured state.

12 Claims, 4 Drawing Sheets

(51) Int. Cl.
  *H02H 3/00* (2006.01)
  *G06F 9/445* (2018.01)
  *H04B 5/00* (2006.01)
  *H04W 4/80* (2018.01)

(52) U.S. Cl.
  CPC .......... *H02H 3/006* (2013.01); *H04B 5/0062* (2013.01); *H04B 5/0031* (2013.01); *H04W 4/80* (2018.02)

(58) Field of Classification Search
  USPC ....................................................... 340/10.51
  See application file for complete search history.

(56) References Cited

U.S. PATENT DOCUMENTS

| | | | |
|---|---|---|---|
| 5,144,517 A | 9/1992 | Wieth | |
| 5,158,464 A | 10/1992 | Landrini | |
| 5,564,086 A | 10/1996 | Cygan et al. | |
| 6,384,350 B1 | 5/2002 | Shincovich et al. | |
| 7,148,738 B2 * | 12/2006 | Knoop | G05B 19/054 327/437 |
| 9,755,424 B2 * | 9/2017 | Esposito De La Torella | H01R 12/7076 |
| 2005/0057277 A1 * | 3/2005 | Chen | H01F 19/08 326/82 |
| 2007/0247768 A1 | 10/2007 | Meehleder et al. | |
| 2008/0041930 A1 | 2/2008 | Smith et al. | |
| 2010/0052826 A1 * | 3/2010 | Callahan | H01L 24/48 333/24 R |
| 2010/0117453 A1 | 5/2010 | Langgood et al. | |
| 2012/0007736 A1 | 1/2012 | Worthington et al. | |
| 2015/0065065 A1 | 3/2015 | Rofougaran et al. | |
| 2015/0099464 A1 | 4/2015 | Kiat et al. | |
| 2015/0229121 A1 | 8/2015 | Davidson | |
| 2015/0296598 A1 | 10/2015 | Haid et al. | |
| 2015/0302733 A1 | 10/2015 | Witkowski et al. | |
| 2016/0226162 A1 | 8/2016 | Emi | |
| 2019/0058325 A1 * | 2/2019 | Esposito | G05B 19/0428 |

FOREIGN PATENT DOCUMENTS

| | | |
|---|---|---|
| JP | 2012080289 A | 4/2012 |
| TW | 201032059 A | 9/2012 |
| WO | 99/21332 A1 | 4/1999 |
| WO | 2004010083 A2 | 4/1999 |
| WO | 2014147093 A1 | 9/2014 |
| WO | 2015025267 A1 | 2/2015 |
| WO | 2015/066007 A1 | 5/2015 |

OTHER PUBLICATIONS

Eaton, Surge Protective Devices Introduction, 4 pages, Nov. 1, 201.
Eaton, Surge Protection Solutions for High Energy Surges and Transient Disturbances Capabilities Overview, 8 pages, Aug. 31, 2016.
International Search Report for PCT/GB2017/050188, dated Apr. 25, 2017, 3 pages.
Japanese Office Action for Application No. 2018-544778 dated Dec. 1, 2020, 9 pages.

* cited by examiner

ELECTRONIC DEVICE CONFIGURATION

CROSS-REFERENCE TO RELATED APPLICATION

This application is a continuation of patent application Ser. No. 16/079,875, filed Aug. 24, 2018 which is a National Stage Entry of, and claims priority to, PCT Patent Application No. PCT/GB2017/050188, filed Jan. 25, 2017, which claims priority to United Kingdom Patent Application No. GB1603207.0, filed Feb. 24, 2016, all of which are hereby incorporated by reference in their entirety.

FIELD OF THE DISCLOSURE

The present invention relates to the configuration of a functional electronic device such as, for example, an electronic device offering isolation and/or barrier functionality and can, if required, relate to devices operating in intrinsically safe environments.

BACKGROUND OF THE DISCLOSURE

Electronic devices offering characteristics such as isolation and/or barrier, or indeed general safety, functionality, find common use in relation to control systems in process-control environments.

A wide variety of process control systems for operating in such environments are known and which require some form of device/circuit isolation.

While known devices such as isolators are generally manufactured with a particular functional requirement in mind, such that the choice of component elements, and respective wiring elements, are generally known and factory-set, there has been a recent emergence of increasingly sophisticated barrier/isolator devices, especially, for example, so called universal isolators. These isolators can offer an ever increasing selection of possible functions within one device. The exact functionality of such devices is therefore not set, and it becomes possible to configure such universal isolators so as to meet one of several possible functional requirements. Such configuration is also known in relation to thermocouple and RTD isolators insofar as it is necessary to set the type and range of sensor.

However, in order to configure such known universal isolators for the required functionality, a configuration unit is connected to the device either by way of serial lines, or by way of a plug-in device, both of which requiring physical connection to the already assembled device. It is commonly required that switches are employed for achieving the selection of the required reconfiguration.

Various disadvantages and limitations have been identified for such known configuration arrangements. For example, when employing the use of serial lines, the configuration is disadvantageously specific to the particular system requirements. Also, when employing cables associated with plug-in devices, such cables can generally be lost or damaged, or otherwise not available at the particular time and location of requirement and this can disrupt or even prevent the configuration process. This can then cause severe problems for the commissioning/use of the whole system in which the universal isolator is to be used. There is also the related disadvantage that the isolator unit may require removal in order to enable the required reconfiguration, and which increases the level of disruption encountered with known systems.

Also, such physical connections to an isolator device can present Electromagnetic Compatibility (EMC) issues and so an operative having responsibility for the configuration needs to be careful to ground him/herself before the configuration process commences. It is a further disadvantage with such known configuration arrangements that the isolator may have to be in a powered state during the configuration process.

SUMMARY

The present invention seeks to provide for a functional electronic device, having configurable functionality and offering one or more advantages over known such devices.

According to a first aspect of the present invention there is provided an isolator device for providing circuit isolation and arranged to offer configurable functionality for alteration of the function of the isolator device, the isolator device including wireless reception means for receiving wireless configuration data for the selective configuration of the device.

Through the provision of the wireless reception means within the functional device arranged for receiving the wireless configuration data, far more flexible, efficient, reliable and also potentially cost-effective configuration of the functional device can be achieved.

In particular, the functional device of the present invention allows an operative to configure the device remotely, and from an appropriate distance, and in any appropriate situation such as, for example, but not limited to, while the device is in a powered, or an unpowered, state, while the device is in assembly mode or indeed in the post-assembly test mode, while the device is either mounted within a functional system, or being manually handled for mounting in such a system, and also while located in situ for example in the field.

Advantageously, the electronic isolator device includes means for wireless transmission of data relating to its configured state.

In such a manner, any previous configuration of the device can readily be remotely checked, and re-checked as required, and at any appropriate time during testing, or when mounted in the field for use.

Advantageously therefore, the wireless reception means is arranged for receiving wireless configuration data while the device is powered.

Alternatively, the wireless reception means is arranged for receiving wireless configuration data while the device is not in a powered state.

As a further advantage, the device includes a non-volatile memory functionality.

In one particularly advantageous embodiment, the wireless reception means comprises a RFID device.

Also, the functional electronic device can include near field communication functionality. In particular, the wireless reception means can exhibit near field communication functionality.

As a further example, the electronic functional device can be arranged to be mobile-enabled.

One particular embodiment of the electronic functional device comprises an isolator device. In particular, the isolator device can comprise a universal isolator.

In another example of the invention, the electronic functional device can comprise a barrier device.

In particular, the functional electronic device is arranged for offering safety functionality for devices operating within an intrinsically safe environment.

As will therefore be appreciated, the present invention provides for particularly efficient, adaptable and cost-effective means for achieving, maintaining, and readily checking, in an advantageously remote manner, the configuration of a functional device such as a universal isolator. The configuration can be achieved, maintained, checked and whether during assembly, post-assembly, during commissioning or later in field-test and in-situ use scenarios.

According to one example, the invention can be arranged such that data obtained from the device can comprise device status and/or diagnostic information.

Any communication devices such as smartphones increasingly have the facility of conversing with an RFID chip via an appropriate application. Accordingly, the configuration unit can then advantageously be incorporated into known and commonly available communication devices such as smart phone devices, laptop computers and tablet devices.

The cost and footprint of RFID devices is also advantageously less than external EEPROMs such as are currently employed for universal isolator configuration.

Additionally there is no need for expensive connectors and associated components.

A device can therefore advantageously, inspect, and check the configuration at any time when in the vicinity of the functional device.

Also, multiple devices can be readily configured/checked as and when required through simultaneous receipt of a configuring/interrogating transmission from a configuration unit.

DETAILED DESCRIPTION OF THE DISCLOSURE

Figure 1A:
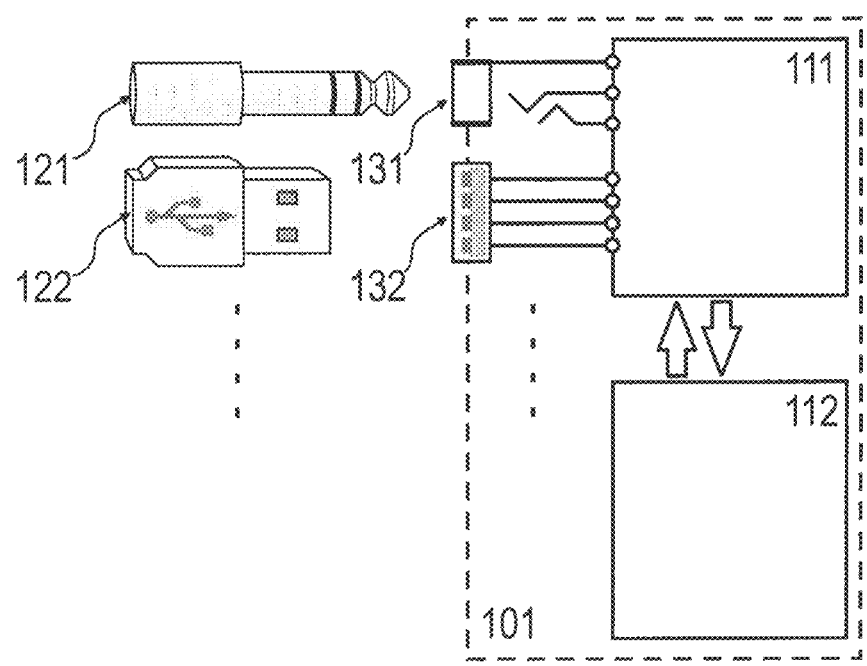
FIG. 1A is a schematic block diagram of a known universal isolator and known options for configuration connectivity.

Turing first to FIG. 1A, there is provided a schematic illustration of a universal isolator which can be arranged, for example, to offer isolation to field devices arranged to operate within an intrinsically safe environment.

The isolator comprises a microprocessor based control element 111 in communication with a non-volatile storage element 112 as indicated by the opposing arrows. The combination of the microprocessor based control element 111 and the non-volatile storage 112 provides for an appropriate one of a plurality of possible configurations for the isolator device as required by the manner of isolation, for example whether within the digital domain or analog domain, and the nature of the field devices, to be isolated.

The particular configuration of the isolator 101 to be employed is controlled through use of a configuration unit which connects to the microprocessor base control element by way of for example, a plug-in connector 121, or a serial connector 122.

As indicated, the plug-in connector 121 is arranged to be received in a socket 131, whereas the connector 122 is arranged to be received in a connector slot 132 as illustrated.

Figure 1B:
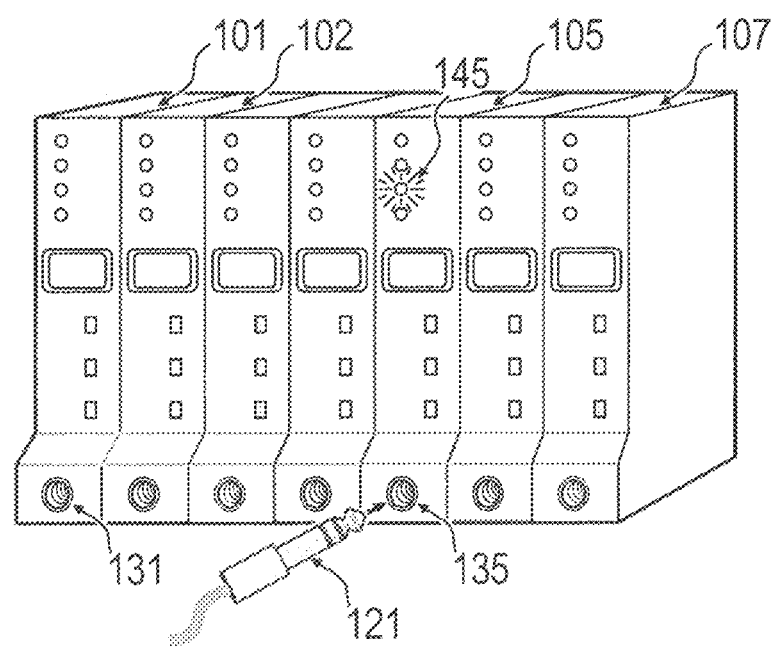
FIG. 1B is a perspective view of the mounting of a plurality of such known universal isolator devices when system-mounted such as mounted within an isolator cabinet for use in relation to an intrinsically safe system.

Further detail of the use of such a known configurable universal isolator 101 is illustrated with reference to FIG. 1B. Here, a plurality of seven isolator units 101-107 are illustrated and wherein one 135 of the sockets is arranged to receive the plug 121 associated with a configuration unit for the delivery of configuration data to the configured isolator 105 which, through illumination of the particular LED 145 indicates the selection and/or manner of configuration.

As will therefore be appreciated for reference to FIGS. 1 and 2, the configuration is disadvantageously limited insofar as the use of the serial line results in a particular configuration specific to the system requirements only, whereas use of the plug 121 requires the ready availability of undamaged cables and at the particular location of requirement.

Figure 2A:
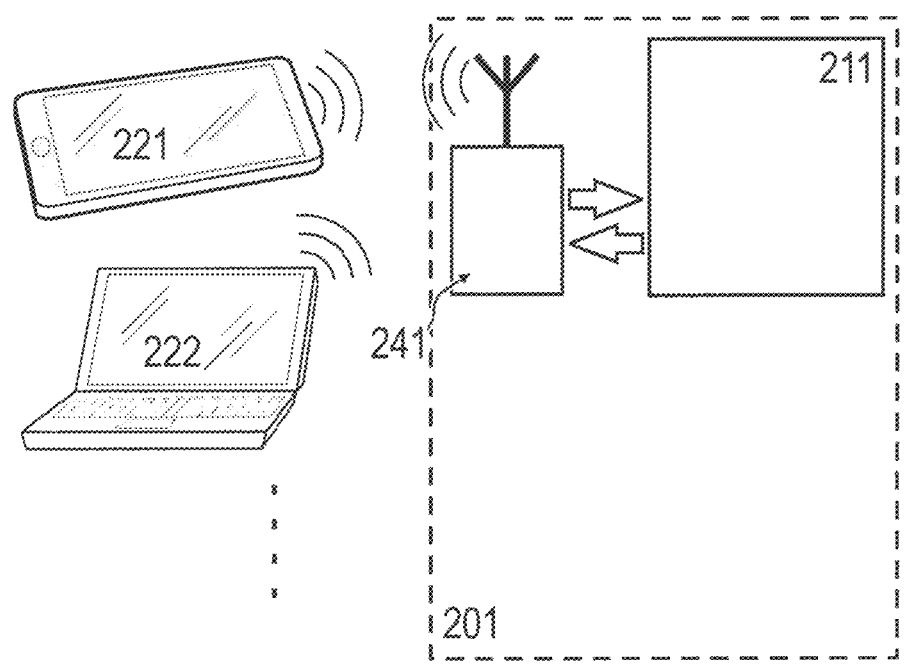
FIG. 2A is a schematic representation of a universal isolator according to an embodiment of the present invention.

Turning now to FIG. 2A, there is provided a schematic illustration of one embodiment of the present invention.

FIG. 2A illustrates a configurable universal isolator 201 as an example of the configurable functional device of the present invention and which employs a micro system control element 211 for use in part of the configuration process.

However, rather than the serial input/sockets of the known configurable universal isolator devices, the example of the present invention offered by isolator 201 employs an RFID unit having a small antenna, commonly in the order of 10 mm, and also offering non-volatile storage functionality.

Thus, the communication of configurable data to, and the transmission of configured data from, the universal isolator 201 can advantageously be employed in a wireless manner and by means of particularly cost effective, and generally readily available, communication devices such as a known smart phone 221, and laptop 222 and indeed other devices such as communication-enabled tablet devices.

Figure 2B:
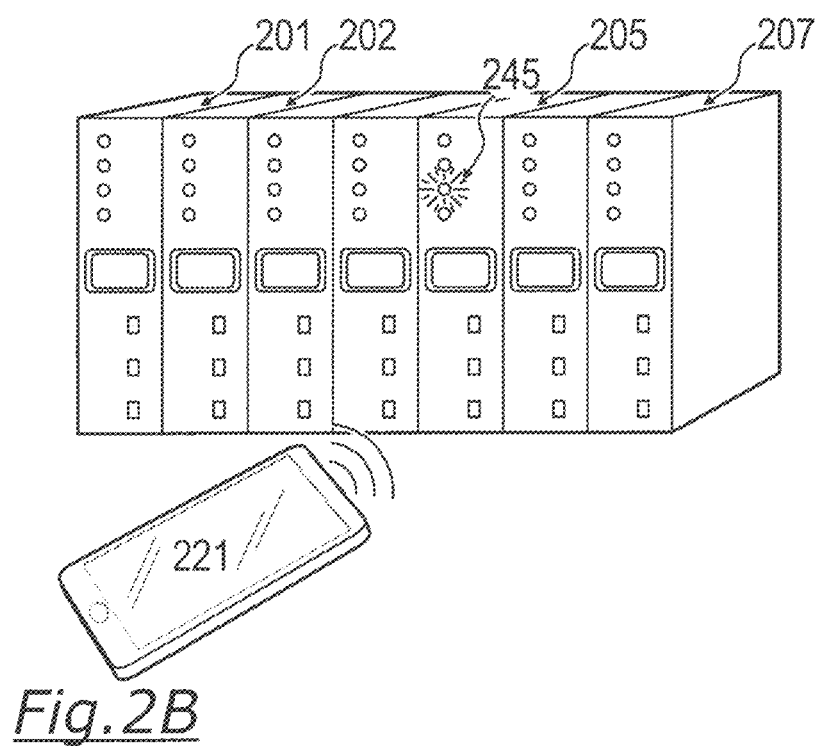
FIG. 2B is a perspective view of an array of universal isolators according to an embodiment of the present invention and forming part of an isolator system within, for example an isolator cabinet of an intrinsically safe system.

With reference to FIG. 2B, there is illustrated the employment of such an isolator 201 of the present invention as a mounting of seven isolator devices 201-207 in which one isolator device 205 is selected, and again as indicated by illuminated LED 245 for appropriate wireless/remote configuration by way of its RFID device (not shown in FIG. 2B) and an operative's smartphone 221.

As will therefore be appreciated, the ability to communicate to the microprocessor control element 211 of the isolator 201 of the present invention allows an operator to configure the isolator 201 at a distance, in any situation, while powered or not, whether on an assembly bench, test bench, whether in an operatives hand, or generally on the fly production or when mounted in the field.

The configuration unit can therefore readily be incorporated within widely available communication devices such as smartphones which can readily be arranged for communication with an RFID chip and which provide for particularly cost effective alternatives to the use of known EEPROMs and connectors as found in the prior art.

In addition, an operative can readily identify, inspect and check the configuration at any time when in the vicinity of the isolator device 201 and, if required, for example, each of the plurality of isolator devices 201-207 as illustrated in FIG. 2B when, for example, mounted within an isolation cabinet, can be configured simultaneously by way of receipt of the configuration data from the hand held device 221.

Of course, it should be appreciated that the invention is not restricted to the exact details of the foregoing embodiment and the remote communication with the configurable isolator device can be by way of any appropriate wireless transmission/reception technology an including those employing Near Field Communication (NFC) communication protocols or otherwise.

The configuration can therefore be advantageously memorised even when the unit is turned off. Also, no direct contact is required with the isolator device due to the use of the transmission/reception of wireless configuration data and so the configuration and subsequent inspection, process can be achieved in a more reliable and efficient manner and, in particular, in a manner not exhibiting EMC issues for the operative.

Additionally, if an isolator is an intrinsically safe device and if it is mounted in a zone of danger, for ex. Zone 2, while a connector based configuration/communication would be forbidden during operation, such a type of communication as herein described would be allowed.

What is claimed is:

1. An electronic functional device comprising:
   an isolator device for providing circuit isolation according to one of a plurality of possible isolation configurations and arranged to offer configurable functionality for selective alteration of the isolation configuration of the isolator device, wherein the isolator device is universal, and
   a wireless transceiver in communication with the isolator device, the wireless transceiver configured for receiving wireless configuration data for the selective isolation configuration of the isolator device and configured for transmitting wireless interrogation data of the selective isolation configuration.

2. The electronic functional device of claim 1, wherein the wireless transceiver is configured to receive wireless configuration data while the isolator device is not in a powered state.

3. The electronic functional device of claim 1, further including a non-volatile memory.

4. The electronic functional device of claim 1, wherein the wireless transceiver comprises an RFID device.

5. The electronic functional device of claim 1, wherein the wireless transceiver employs near field communication functionality.

6. The electronic functional device of claim 1, wherein the isolator device is configured to provide barrier functionality.

7. The electronic functional device of claim 1 in combination with one or more devices, the electronic functional device configured to provide safety functionality for the devices operating within an intrinsically safe environment.

8. An electronic functional device comprising:
   an isolator device for providing circuit isolation according to one of a plurality of possible isolation configurations and arranged to offer configurable functionality for selective alteration of the isolation configuration of the isolator device, wherein the isolator device is universal, and
   a transceiver in communication with the isolator device, the transceiver configured for receiving configuration data for the selective isolation configuration of the isolator device and configured for transmitting interrogation data of the selective isolation configuration, wherein the transceiver is configured to transmit data related to status and diagnostic information of the isolation device.

9. The electronic functional device of claim 8, further including a non-volatile memory.

10. The electronic functional device of claim 8, wherein the isolator device is configured to provide barrier functionality.

11. The electronic functional device of claim 8 in combination with one or more devices, the electronic functional device configured to provide safety functionality for the devices operating within an intrinsically safe environment.

12. An electronic functional device comprising:
    an isolator device for providing circuit isolation according to one of a plurality of possible isolation configurations and arranged to offer configurable functionality for selective alteration of the isolation configuration of the isolator device, wherein the isolator device is universal, and
    a wireless transceiver in communication with the isolator device, the wireless transceiver configured for receiving wireless configuration data for the selective isolation configuration of the isolator device and configured for transmitting wireless interrogation data of the selective isolation configuration,
    in combination with one or more devices, the electronic functional device configured to provide safety functionality for the devices operating within an intrinsically safe environment.

* * * * *